(12) United States Patent
Gatt (10) Patent No.: US 7,193,720 B2
(45) Date of Patent: Mar. 20, 2007

(54) OPTICAL VIBRATION IMAGER

(75) Inventor: Philip Gatt, Longmont, CO (US)

(73) Assignee: Lockheed Martin Coherent Technologies, Inc., Louisville, CO (US)

(*) Notice: Subject to any disclaimer, the term of this patent is extended or adjusted under 35 U.S.C. 154(b) by 70 days.

(21) Appl. No.: 11/130,927

(22) Filed: May 17, 2005

(65) Prior Publication Data

US 2006/0262319 A1 Nov. 23, 2006

(51) Int. Cl.
*G01B 9/02* (2006.01)
(52) U.S. Cl. ........................................ 356/489; 73/657
(58) Field of Classification Search ................ 356/489, 356/495, 502, 511, 512; 73/655–657
See application file for complete search history.

(56) References Cited

U.S. PATENT DOCUMENTS

| | | | | |
|---|---|---|---|---|
| 3,670,098 A | * | 6/1972 | Korpel | ........................ 73/656 |
| 4,195,221 A | * | 3/1980 | Moran | ........................ 356/489 |
| 4,662,741 A | | 5/1987 | Duvall, III et al. | |
| 4,666,295 A | | 5/1987 | Duvall, III et al. | |
| 4,721,385 A | | 1/1988 | Jelalian et al. | |
| 4,935,610 A | | 6/1990 | Wike, Jr. | |
| 5,289,252 A | | 2/1994 | Nourrcier | |
| 5,434,668 A | | 7/1995 | Wootton et al. | |
| 5,495,767 A | | 3/1996 | Wang et al. | |
| 5,610,705 A | | 3/1997 | Brosnan et al. | |
| 5,682,229 A | | 10/1997 | Wangler | |
| 5,715,044 A | | 2/1998 | Hayes | |
| 5,877,851 A | | 3/1999 | Stann et al. | |
| 6,100,965 A | | 8/2000 | Nerin | |
| 6,233,045 B1 | | 5/2001 | Suni et al. | |
| 6,386,042 B2 | | 5/2002 | Wortge et al. | |
| 6,486,959 B2 | * | 11/2002 | Delaye et al. | ............... 356/457 |
| 6,657,732 B2 | * | 12/2003 | Pepper et al. | ............... 356/502 |
| 6,707,054 B2 | | 3/2004 | Ry | |
| 6,844,936 B2 | * | 1/2005 | Dalhoff | ...................... 356/498 |
| 2001/0009111 A1 | | 7/2001 | Wortge et al. | |
| 2003/0010128 A1 | * | 1/2003 | Buell et al. | .................... 73/655 |
| 2003/0189712 A1 | * | 10/2003 | Pepper et al. | ............... 356/502 |
| 2005/0185191 A1 | * | 8/2005 | Shpantzer et al. | .......... 356/485 |
| 2005/0237533 A1 | * | 10/2005 | Lal et al. | ..................... 356/486 |
| 2006/0227316 A1 | * | 10/2006 | Gatt | .......................... 356/5.09 |

OTHER PUBLICATIONS

Peter J. Degroot and Gregg M. Gallatin, "Three-Dimensional Imaging Coherent Laser Radar Array," Optical Engineering 28, 456 (1989).

(Continued)

*Primary Examiner*—Gregory J. Toatley, Jr.
*Assistant Examiner*—Patrick Connolly
(74) *Attorney, Agent, or Firm*—McDermott, Will & Emery LLP (57) ABSTRACT

A remote sensor capable of imaging vibrations at many simultaneous points using high-speed imaging cameras is disclosed. The preferred embodiment operates in heterodyne detection mode using a single camera to capture signals to recover multi-pixel vibrations. One alternative embodiment employs two cameras and homodyne optical I/Q detection. A second alternative embodiment uses a single camera and temporally phase shifted local oscillator to also carry out homodyne optical I/Q detection. The disclosed sensors are capable of scalability to large numbers of pixels and can capture vibration frequencies over a wide range.

27 Claims, 7 Drawing Sheets

OTHER PUBLICATIONS

Toshihiko Yoshino, et al., "Laser Diode Feedback Interferometer for Stabilization and Displacement Measurements," Applied Optics 26, 892, 1987.

D.O. Hogenboom and C. A. DiMarzio, "Quadrature Detection of a Dopler Signal," Applied Optics, vol. 37, No. 13, pp. 2569-2572 (1998).

* cited by examiner

OPTICAL VIBRATION IMAGER

BACKGROUND OF THE INVENTION

1. Field of the Invention

This invention is in the field of laser sensors, specifically relating to apparatus and methods for remotely measuring vibrations of objects, over a multitude of spatial points simultaneously.

2. Relevant Background

Simple single point vibration measurements are important in a number of fields, including determining the state of machinery and identification of objects based on their vibrational behavior. More complex vibration sensors carry out measurements of vibrations at a number of points on a target in order to gather further information, such as determining vibrational modes of an object. It is desirable to carry out the measurements in a non-contact manner in many cases. In some applications this desire is driven by the need for covertness, in other applications physical contact with the target may significantly alter the vibrational behavior such that the measurements become invalid. In yet other applications the object may be difficult to access with contact devices.

Lasers have a long history of being used indirectly or directly for vibration measurements. Direct measurements usually involve Doppler frequency measurements and rely on the fact that a vibration is a periodic motion. The temporal motions of a vibrating object can be described by the equation $s(t)=d \cdot \sin(2\pi f_v t)$, where d is the amplitude of the motion and $f_v$ is the vibrations frequency. Differentiating this expression gives an expression for the velocity of the object with time as $v(t)=2\pi f_v d \cdot \sin(2\pi f_v t)$.

The frequency of a laser beam is shifted by an amount $f_D$ by reflecting from an object moving at a velocity v by an amount given by $f_D=2v/\lambda$. Consequently, pointing the laser at a vibrating target causes the scattered light to have a frequency that varies as $f_D(t)=4\pi f_v d/\lambda \cdot \sin(2\pi f_v t)$. This temporal modulation is on top of the normal periodicity of the laser electric field amplitude at a frequency f, so that the total electric field of the laser beam after reflection from a vibrating target is $E_v(t)=E_0 \sin[2\pi ft+4\pi f_v d/\lambda \cdot \sin(2\pi f_v t)+\phi]$, where $\phi$ is a phase that has several additive components. These additive components include a component that depends interferometrically on the distance R to the target and the laser wavelength $\lambda$ and equals $4\pi R/\lambda$ and another component that is a random phase due to random target scattering. In the case where a frequency shift $f_s$ is imposed on the laser beam before transmission, for example by passing the beam through an acousto-optic modulator (AOM), the return signal becomes $E_v(t)=E_0 \sin[2\pi(f+f_s)t+4\pi f_v d/\lambda \cdot \sin(2\pi f_v t)+\phi]$. Optically mixing this signal with a local oscillator field $E_{LO}(t)=E \sin[2\pi ft]$ results in a difference frequency term equaling $E_h \cos[2\pi f_s t+4\pi f_v d/\lambda \cdot \sin(2\pi f_v t)+\phi^-]$ When the frequency shift $f_s$ is non-zero this is referred to as heterodyne mixing and when the shift is zero it is referred to as homodyne mixing. In both cases the vibration signal can be extracted from the mixing term, but there are significant differences in how the extraction is done.

In many cases heterodyne mixing is used and $f_s$ is large enough to always be greater than the highest Doppler shift imposed by the vibrating target, i.e., $f_s>4\pi f_v d/\lambda$. This ensures that a clear distinction can be made between the frequency shift due to the vibration and that due to the imposed frequency shift. As an example, if $d\sim\lambda$ and $f_v=1$ kHz then $f_s$ should be chosen to be greater than approximately 12 kHz. When $\lambda=1500$ nm this corresponds to a maximum vibrational velocity of 9.4 mm/s. In many practical cases, including heterodyne laser "vibrometers" available commercially from e.g. Polytec PI (Auburn, Mass.) the frequency shift is imposed using an acousto-optic modulator with a typical frequency shift of several tens of MHz. As long as the detector has sufficient bandwidth such a large frequency shift is not a problem.

The homodyne case is typically simpler to implement from a hardware perspective but also has limitations. In particular homodyne mixing does not permit unambiguous phase recovery and consequently it sees no difference between positive and negative velocities. One further consequence is easily seen from the last equation. If the phase term $\phi=0$ or an even multiple of $\pi$ the mixing term becomes $E_h \cos[4\pi f_v d/\lambda \cdot \sin(2\pi f_v t)]$. It is then easily seen that a vibration at a frequency $f_v$ produces a mixing term that varies periodically at twice that frequency, or $2f_v$. On the other hand if the interferometric phase $\phi$ is an odd multiple of $\pi/2$ the mixing term becomes $E_h \sin[4\pi f_v d/\lambda \cdot \sin(2\pi f_v t)]$ and the effective frequency doubling does not occur. This dependence on the interferometric phase obviously makes accurate recovery of the signal difficult or impossible without additional steps being taken. A number of prior art patents make no notice of this subtle but extremely important effect that renders the most simple implementations of homodyne laser vibration sensors largely useless. U.S. Pat. No. 5,434,668 to Wootton et al. describes a homodyne vibration sensor system that is intended to classify targets as "friend or foe" depending upon the detected vibration signatures. No provisions are made to account for the interferometric phase impact upon the detection of vibration spectra and it therefore appears unlikely that the described system could be used to accurately map detected vibration spectra to stored library spectra as noted in the patent. U.S. Pat. No. 5,495,767 describes an even simpler homodyne system in the form of a well known Michelson interferometer without discussing the interferometric phase issue.

A method that does permit recovery of full phase information uses quadrature or I/Q demodulation. This technique uses two detectors and offsets the local oscillator phase by $\pi/2$ between the detectors. This permits one to simultaneously generate in-phase (I) and quadrature (Q) mixing signals of the form $E_I(t)=E_h \cos[4\pi f_v d/\lambda \cdot \sin(2\pi f_v t)+\phi]$ and $E_Q(t)=E_h \sin[4\pi f_v d/\lambda \cdot \sin(2\pi f_v t)+\phi]$, from which the vibration signal can be unambiguously recovered irrespective of the value of the interferometric phase. A practical method to implement optical I/Q detection has been described in Hogenboom, D. O. and diMarzio, C. A., "Quadrature detection of a Doppler signal", Applied Optics 37, 2569 (1998).

Most laser vibrometers to date have been concerned with the recovery of vibration information at a single location ("pixel"). At the same time there is great interest in measuring the simultaneous motion at multiple points. Examples include mapping the vibrational behavior (modal analysis) of a loudspeaker surface or a body panel in a vehicle. At present such mapping is done using a single point laser sensor in conjunction with scanning devices that move the position of the measurement point using, typically, a pair of movable mirrors. Such scanning devices are available commercially, for example the model PSV-400 from Polytec, and are also disclosed in U.S. Pat. No. 6,386,042 to Wortge and Schussler, and United States patent application 20010009111 also to Wortge and Schussler. One very significant drawback to these scanning methods is that they can become extremely time consuming. In order to accurately measuring vibrations the sensor must dwell on each point for a duration on the order of the vibration period. For a low frequency vibration with a period of, for example, 0.1 second, scanning 1000 points would take on the order of 100 seconds. Such long measurement times are often unacceptable, for example if the vibrating event is transient in nature, or if the measurement conditions change over time.

Another problem with the scanned approach is that additional care must be taken to ensure that the relative phase between spatially separate measurement points is known. If the phase is uncertain modal analysis will be inaccurate.

SUMMARY OF THE INVENTION

Briefly stated, the present invention provides for apparatus and methods of use that solve the aforementioned problems by capturing and processing vibration signals from multiple points simultaneously thereby providing a vibration image (flash imaging) without scanning. A vibrometer is configured such that multiple measurement points of interest are illuminated at once and the illuminated target is imaged to a high-speed camera. Additionally, a phase matched local oscillator beam, serving as a reference beam, is provided at each pixel location, to yield an interference signal whose phase is proportional to the target displacement. Multiple alternative embodiments of the invention are disclosed, including heterodyne configurations incorporating a frequency shifter and homodyne configurations that employ optical I/Q detection.

An enabling technology is the availability of electronic camera technology that is sufficiently fast to usefully capture and output data from many pixels simultaneously to a computer that can process the data and extract vibration information. Conventional cameras developed for video or still photography use typically frame rates in the tens of Hz range or lower. The cameras used in the present invention have effective frame rates in the tens of kHz or higher, several orders of magnitude higher than conventional cameras.

A specific benefit in accordance with embodiments of the invention is that it provides a means to perform flash vibration imaging without the need for scanning.

A further specific benefit of embodiments of the invention is that it provides a means to perform such imaging using commercially available camera technology.

A further specific benefit of embodiments of the invention is that the disclosed approach is scalable to large numbers of image pixels without requiring highly complex electronics.

DETAILED DESCRIPTION OF THE PREFERRED EMBODIMENTS

Figure 1:
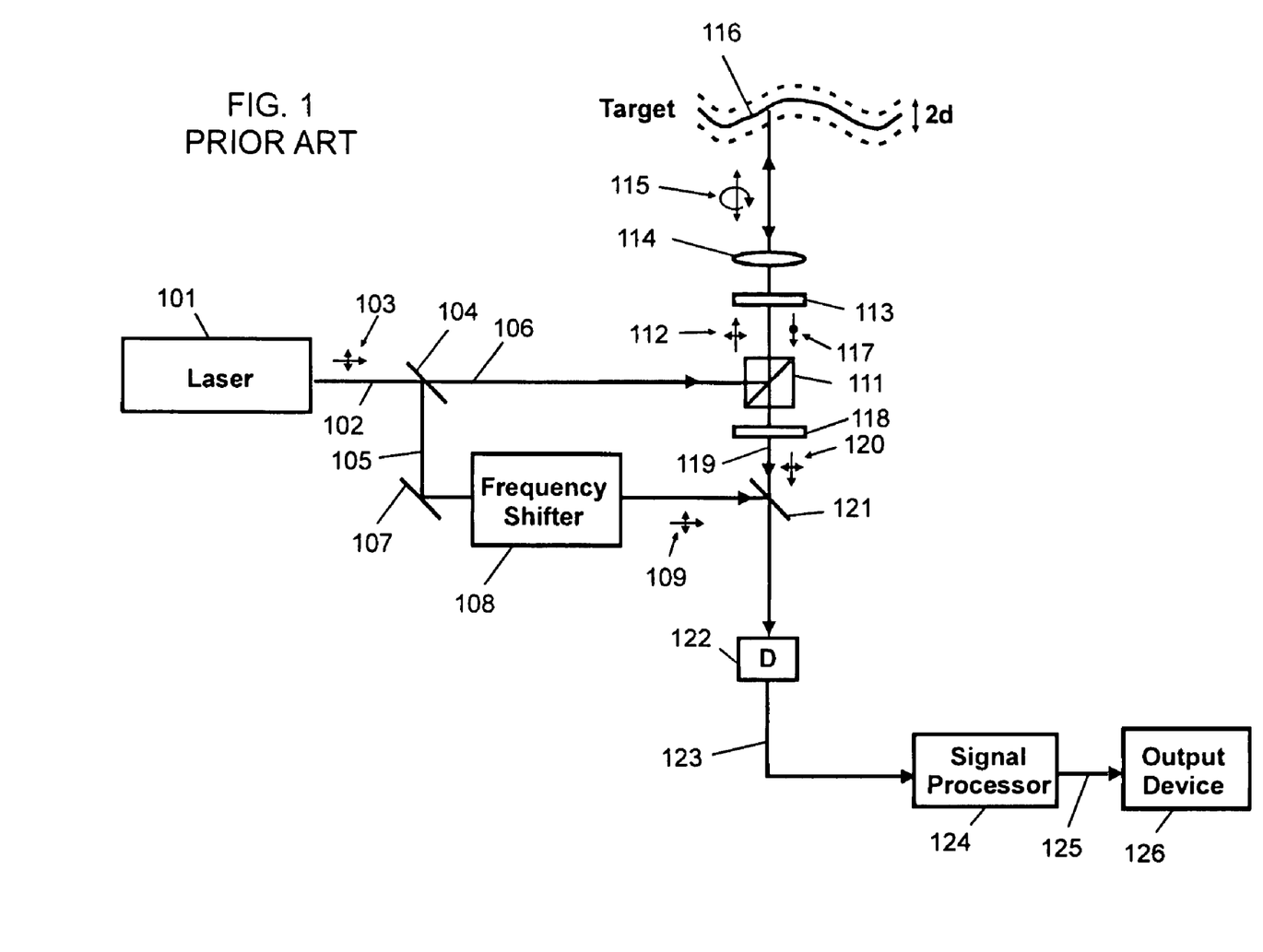
FIG. 1 shows a prior art configuration of a single pixel optical system used to measure vibrations using heterodyne detection.

FIG. 1 illustrates the principle of how measurements are performed with a prior art single pixel system configured to perform heterodyne detection measurements. A laser 101 outputs a beam 102 that is linearly polarized, for example in the plane of the paper as indicated by symbol 103. The orientation of the linear state is not critical at this stage, however, the alteration of the state by subsequent optical elements is significant. The laser beam 102 is preferably single frequency and for vibration measurements the laser typically operates in continuous-wave (CW) mode. Laser beam 102 is then split using beam splitter 104 to create two new beams 105 and 106. The ratio of power between beams 105 and 106 is determined by the application and by the requirements imposed by the receiver system. In a simple case the total laser power may be 100 mW and beam splitter 104 is constructed to send for example 10 mW to beam 105 and 90 mW to beam 106. Beam 105 is directed, using optical element 107, through a frequency shifting device 108 that shifts the frequency of the laser light by a desired amount. It is apparent to those skilled in the art that what matters is not the specific location of the frequency shifter but the function it performs of producing a relative frequency shift between laser beams 105 and 106. The device could, for example, be placed in beam 106 instead of in beam 105 and it could in principle be placed in the return path of light from the target. Following transit through frequency shifter 108 the beam is incident on beam splitter 121 with the polarization state unchanged as indicated by symbol 109. This beam is referred to as the local oscillator (LO) beam.

Laser beam 106 propagates from beam splitter 104 to polarizer 111 that is constructed using conventional means to reflect substantially all of the light in one polarization state and to transmit substantially all of the light in the orthogonal polarization state. Polarizer 111 consequently produces a beam with an unchanged polarization state as indicated by symbol 112 that propagates in the indicated direction through quarter-wave plate (QWP) 113 to create a circularly polarized beam of light as indicated by symbol 115. The beam may also pass through an optical system 114 to direct the beam to target 116. The optical system 114 is illustrated as a simple lens for ease of understanding but could obviously be a more complex optical system, for example a multi-element telescope. Optical system 114 may also include mirrors to point the beam in the desired direction.

For vibration measurements it is assumed that target 116 is undergoing vibrations with a peak-to-peak amplitude of 2d in the direction along the laser beam. Light reflected from target 116 is consequently modulated with a time varying Doppler shift as discussed in the introduction. Some fraction of the light returns back along the same path, passing again through optical system 114 and through QWP 113. Following passage through QWP 113 the light is now polarized orthogonally to the transmitted light as indicated by symbol 117. Consequently substantially all the light is transmitted through polarizer 111 and is next sent through half-wave plate (HWP) 118 to create a light beam 119 that is incident on beam splitter 121 with the same polarization as the local oscillator beam, as indicated by symbol 120. This is referred to as the signal beam.

Beam splitter 121 performs the function of optically mixing the LO and signal beams. Beam splitter 121 is typically designed to transmit a relatively large fraction of the signal beam, for example 90%, while at the same time reflecting 10% of the LO beam. The orientation of beam splitter 121 is chosen such that the LO and signal beams substantially overlap in size, position, and propagation direction following this mixing. The mixed beam then propagates to detector (D) 122 where the heterodyne beat signal is detected. The detector 122 typically comprises the actual optical detector together with electronics circuitry required for amplification, filtering, and the like, and is frequently referred to as the receiver, rather than just a detector. The electrical signal 123 from the receiver is then sent to signal processor 124 for extraction of vibration information. This information is then passed along line 125 to a user interface or output device 126.

Figure 2:
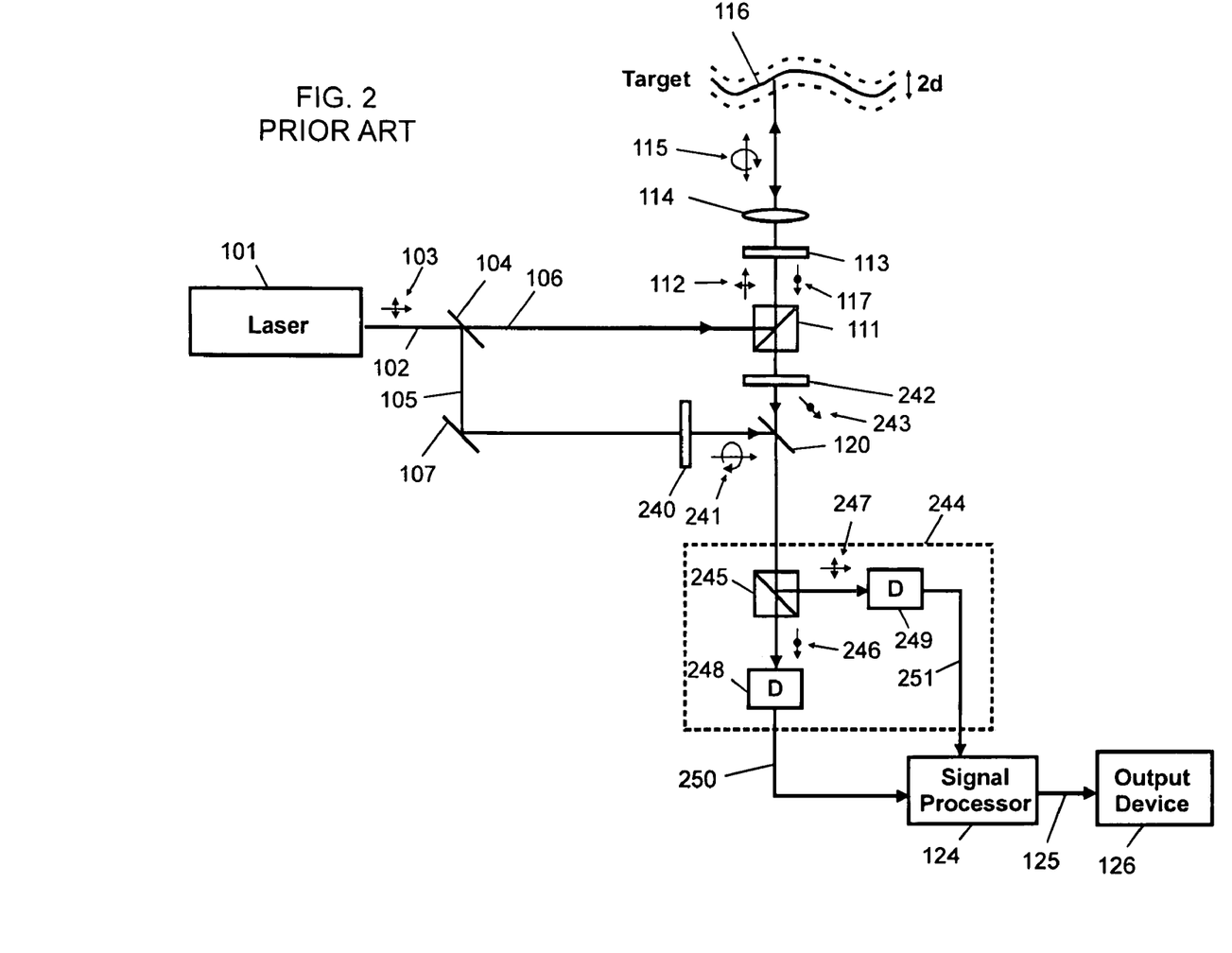
FIG. 2 shows a prior art configuration of a single pixel optical system used to measure vibrations using homodyne I/Q detection.

A homodyne single-point sensor that uses I/Q detection can be constructed as shown in FIG. 2. Many elements are the same as those in FIG. 1 and for clarity the same numerals are used. In FIG. 2 the local oscillator beam is created in the same manner as in the heterodyne case, except for two differences. One difference is that there is no frequency shifting element in the system. The second difference is that LO beam 105 is passed through a QWP 240 to create a circularly polarized beam as indicated by symbol 241.

The signal beam is generated in the same manner as described above, but following passage through polarizer 111 the signal beam passes through a half-wave plate (HWP) 242 oriented such that the transmitted beam is polarized at substantially 45 degrees to a horizontal or vertical axis. This is indicated by symbol 243. The LO and signal beams again mix in beam splitter 120. However, because of the manipulation of polarizations phase information is now preserved, in addition to amplitude information, and this can be extracted through the construction of an I/Q demodulator as indicated by dashed box 244 in FIG. 2. By inserting a polarizer 245 in the path of the mixed beam we can split the mixed beam into one part polarized in the plane of the paper as indicated by symbol 247 and a second mixed part polarized into the paper as indicated by symbol 246. Each of these beams is then detected with detectors 248 and 249 and the corresponding output electrical signals 250 and 251 are sent again to signal processor 124 and subsequently to output.

The invention disclosed here improves upon the prior art concepts discussed with reference to FIGS. 1 and 2 in a number of ways that will now be discussed.

We first note that an optical system, such as item 114 in FIGS. 1 and 2, may be used to transmit light to a target and receive scattered light in the form of a single laser beam of small size. This is the manner in which single pixel systems are normally designed. With proper design, in particular ensuring that the illuminating beam has sufficient transverse extent to illuminate the area of interest, the optical system may also be designed to image a target of extended transverse size as is conventionally done with imaging cameras. In the case of a multi-pixel electronic camera an image is formed at the camera's detector surface such that there is a one-to-one correspondence between points at the target plane and points at the detector plane.

As is clear from the above discussion of heterodyne and homodyne detection, simply imaging modulated light onto a detector is not sufficient to enable recovery of vibration information. To be useful the light is mixed with a local oscillator beam in order to obtain a mixed signal where the high-frequency (typically ~100 THz in the case of optical beams) carrier has been eliminated and only lower frequencies remain. This means that each pixel receives not only light from a target pixel but it also from a co-aligned local oscillator beam present that provides the down-mixing. In the case of heterodyne detection it is also essential that the frequency shift imposed is small enough that it falls within the bandwidth of the detectors. This is not normally the case with AOM's and similar devices. With typical frequency shifts in the tens of MHz the bandwidths are far too high to be useful with high pixel count cameras. What is needed in this case is a low offset frequency. This frequency is chosen to be, for example, approximately one half of the per pixel bandwidth. As an example, if each pixel is outputting data at a rate of 100 kHz the frequency shift may be chosen to be 50 kHz. With conventional this means that negative Doppler frequencies are mapped into the frequency range of 0–50 kHz and positive Doppler frequencies are mapped into the range of 50–100 kHz. Low offset frequencies may be produced in a number of different ways. For example, one may reflect a beam from a linearly moving mirror or one may cascade two acousto-optic devices. As an example, if the first device down-shifts the frequency by 50.00 MHz and the second device up-shifts the frequency by 50.05 MHz the result will be a total shift of 50 kHz. Many variations are possible, for example upshifting the local oscillator beam by 50.00 MHz and upshifting the signal beam by 50.05 MHz. Implementing devices that have a tunable offset frequency may also be desirable, for example in nulling out large Doppler shifts cause by relative motion between the sensor and the target.

Figure 3:
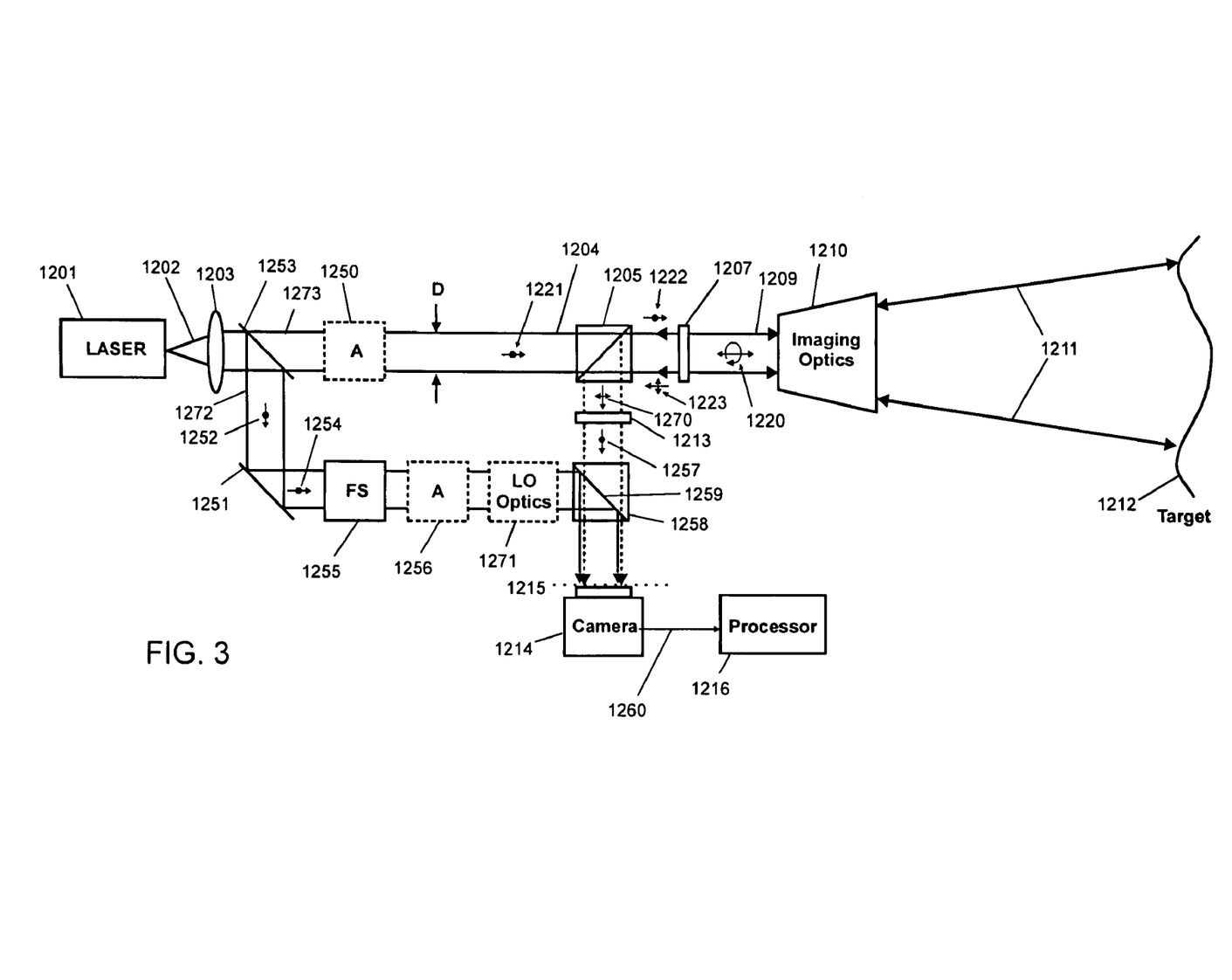
FIG. 3 shows the preferred embodiment of the invention using a single camera and heterodyne detection to measure vibrations at multiple points.

We now discuss implementation of a heterodyne vibration imaging sensor according to the preferred embodiment of the present invention with reference to FIG. 3. In FIG. 3 a laser 1201 outputs a laser beam 1202 that may be collimated of diverging (as illustrated). Optics 1203 are used to transform the beam one having a transverse extent D, where D is a predetermined dimension, in many cases being approximately equal to the transverse extent of the camera light sensitive surface. Optics 1203 may be a simple lens as illustrated or it may be a more complex set of optical elements, such as a telescope to transform a small beam diameter to a larger beam diameter.

Beam splitter 1253 is used to split the laser beam into two portions 1272 and 1273 with a splitting ratio that depends upon the specific application as discussed with reference to the prior art. Beam 1273 forms the transmit beam with a polarization indicated by symbol 1221, propagates through polarizer 1205 with unchanged polarization 1222, and through QWP 1207 where the polarization is converted to circular polarization 1220. The resulting beam 1209 is then incident on an imaging optical system 1210 that fulfills two functions. First the optical system 1210 transforms beam 1209 such that it illuminates a target 1212 with illumination having a pre-determined transverse extent. Imaging optics 1210 may be a simple lens, but may also incorporate multiple optical elements. One reason for incorporating additional optics is to ensure that optical aberrations are corrected; another reason is that focusing and/or zoom capabilities may be added to add flexibility to the system.

Light is then generally transmitted to the target over an angular extent defined by illustrated beams 1211. Light scattered from the target returns along the same general path, is captured by imaging optics 1210, and propagates to the camera plane 1215 such that an image of target 1212 is formed at camera plane 1215. This imaging function is the second function fulfilled by the imaging optics 1210.

In proceeding to the image plane 1215 the scattered light is transformed to maximize detection efficiency by first propagating the light back through QWP 1207 to create a linearly polarized beam 1223 that reflects from polarizer 1205 with a polarization 1270. That polarization is in turn rotated by 90 degrees in half-wave plate 1213 to create a polarization indicated by 1257. A portion, for example 90%, of this beam is transmitted through beam splitter 1258 having a suitable partially transmitting coating 1259 and further propagates to image plane 1215 that is substantially coincident with the light sensitive surface of camera 1214.

Light beam 1272 reflected from beam splitter 1253 is used as the local oscillator (LO) beam after transformations that we now describe. The beam 1272 has a polarization state indicated by symbol 1252 that is substantially the same as that of return light 1257. The beam is next reflected off mirror 1251 and is transmitted through frequency shifter 1255 and further propagates to beam splitter 1258 where it is reflected from coating 1259 with a reflection efficiency that is substantially complementary to the transmission efficiency of the received signal beam. If the received signal transmits with 90% efficiency then the LO beam reflects with an efficiency of 10%, provided that there are no substantial losses in the optics. Following reflection from beam splitter 1258 the LO beam co-propagates with the signal beam to image plane 1215. The mixed beam is detected by camera 1214 and the data is transferred on line 1260 to signal processor 1216.

Several aspects of the system are important in ensuring proper operation. One consideration is that sufficient laser power is present in both beams 1273 and 1272 to be useful. Beam 1273 has sufficient power to illuminate target 1212 with enough intensity that scattered light detected at the camera produces sufficient signal to be useful. The exact amount of light required is highly dependent on the application but as an example it may be desired to illuminate each target pixel (defined at the target area that images to substantially a single detector pixel) with 1 mW. If the total number of illuminated pixels equals 1000 this would require approximately 1 W in beam 1273. If the laser 1201 produces an insufficient amount of power it is possible to insert an optical amplifier 1250 to boost this power. It is also evident that and optical amplifier 1256 may be inserted into the local oscillator beam leg if the power in that leg is insufficient. Other possibilities are clearly evident to those skilled in the art, such as inserting an amplifier before beam splitter 1253 in order to effectively amplify both beams 1272 and 1273.

In order for coherent mixing of two light fields to be efficient it is desirable that three conditions are met. First the two fields should have the same polarization. This is implemented by altering polarizations. Second, at each detector pixel location the wavefronts of the local oscillator beam and the received signal beam are aligned. Ensuring that this alignment occurs is not a trivial matter when the signal beam has a beam product (angular divergence times transverse dimension) that is much greater than that of a diffraction limited beam. In many cases it is easiest to discuss the effect in terms of planar wavefronts, as we will do here. Nonplanar (for example spherical) wavefronts will also mix efficiently and may be incorporated without loss of generality. In the example described with reference to FIG. 3 the local oscillator produces planar wavefronts at the camera (image) plane, in the simplest case illuminating the whole light sensitive detector with a wide collimated beam propagating in the same direction as the received signal beam. In order to obtain high mixing efficiency with this simple arrangement it is necessary to ensure that the mean propagation angle of light beams at each pixel location is small. This condition is generally satisfied near the center of the detector array but may not be satisfied further from the center. The condition means that simple arrangement in FIG. 3 applies well to systems where the F-number of the imaging optics 1210 is high.

In order to operate efficiently with low F-number systems that generally increases light gathering efficiency and promotes compactness of the sensor system, it is then desired to make suitable alterations to the system optical design to provide good matching between signal and local oscillator at all pixel locations. A number of alterations are possible and operation of the invention does not rely on a specific implementation.

Figure 4:
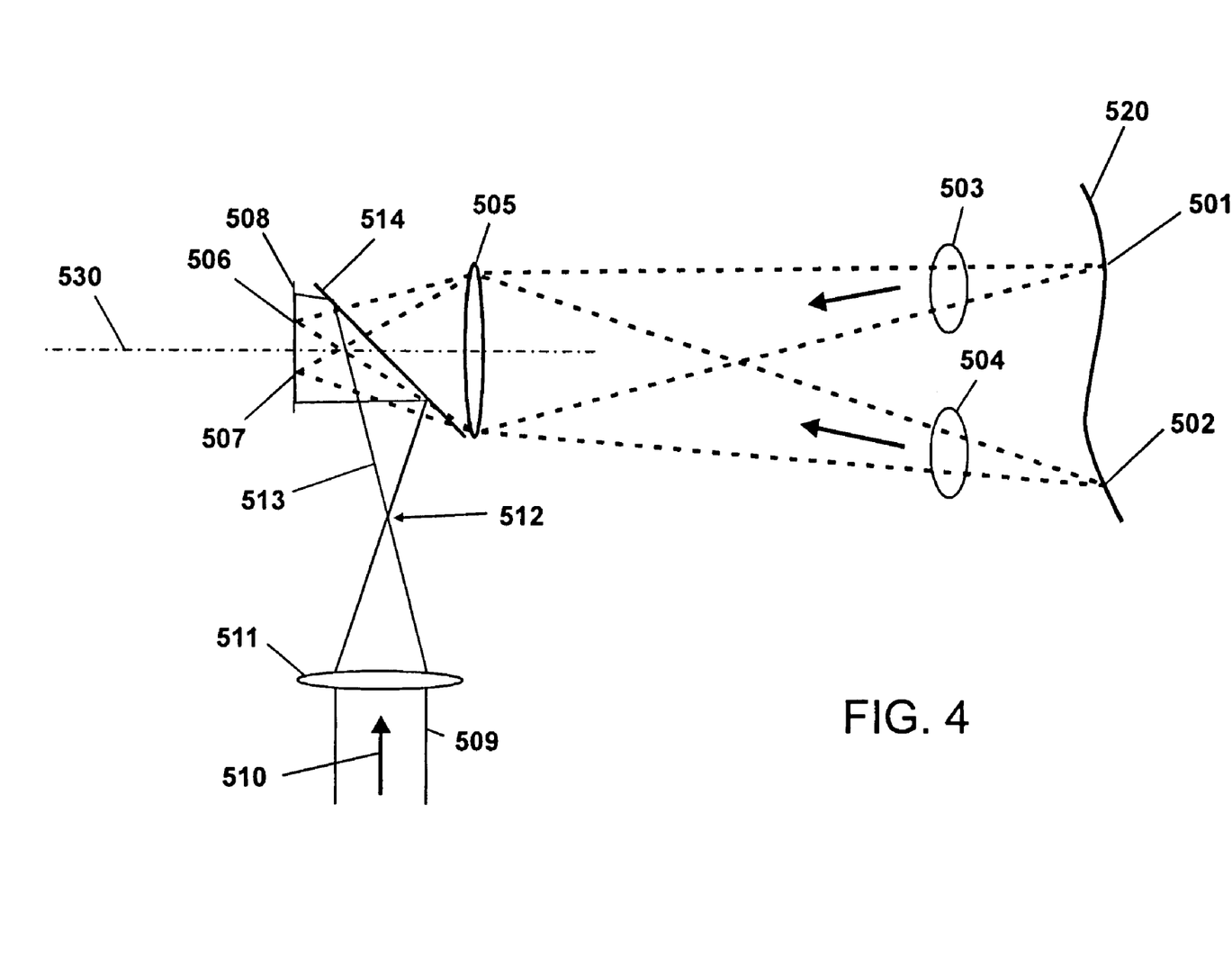
FIG. 4 shows the use of a lens to create a mode-matched local oscillator beam.
Figure 5:
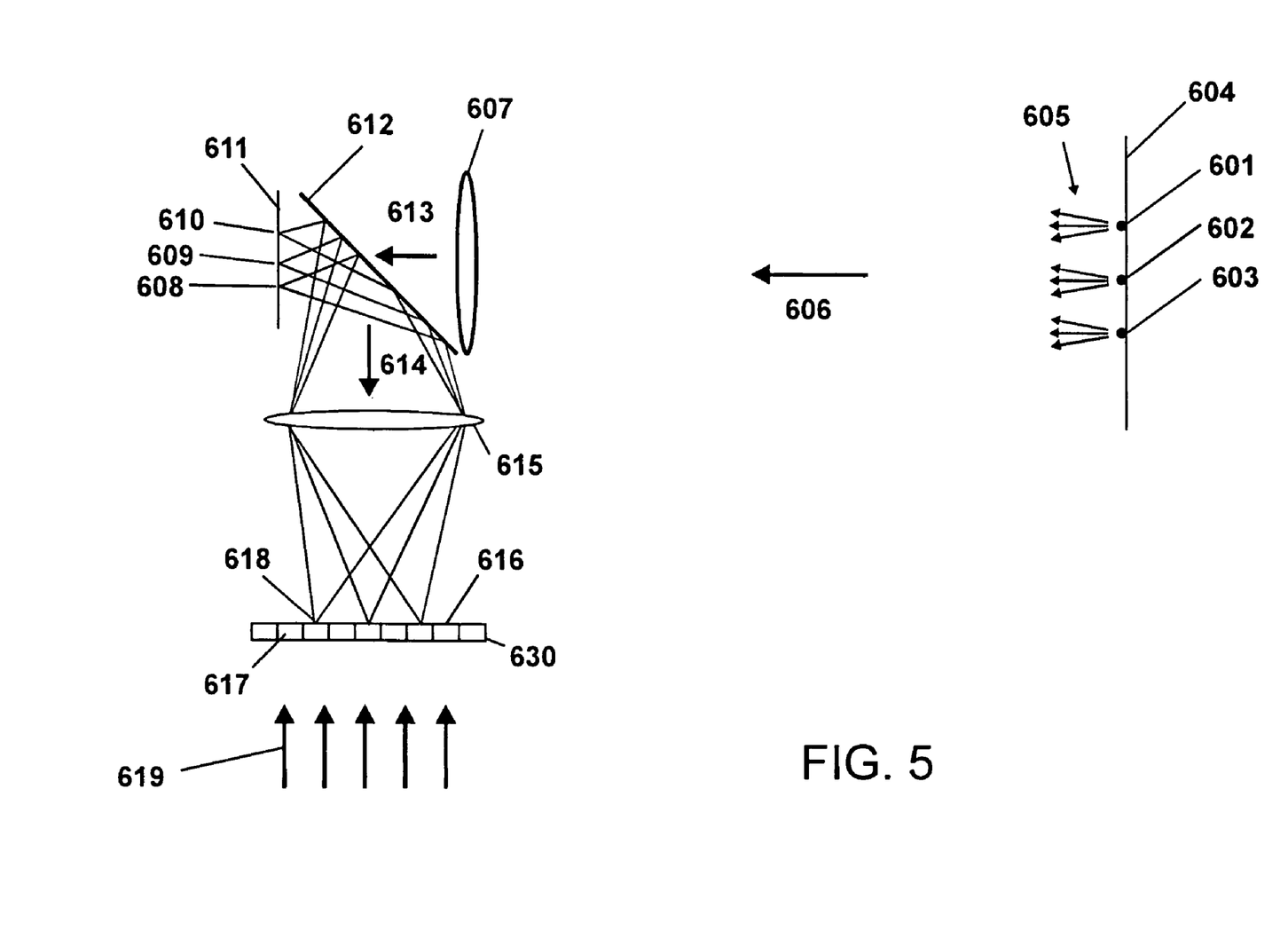
FIG. 5 shows the use of a diffractive element to create a mode-matched local oscillator beam.

In FIG. 4 and FIG. 5 some system components are omitted in order to describe the essential features of efficient mixing of signal and local oscillator light. In FIG. 4 it is assumed that a target surface 520 is illuminated by a laser beam (not shown). This causes light to be scattered by the surface. In the case of a diffuse surface light scattering centers exemplified by 501 and 502 produce scattered light beams 503 and 504 that propagate to imaging optics 505 configured to cause an image of target 520 to be present at detector plane 508. In other words light emanating from target position 501 is imaged to detector position 507 and light from 502 is imaged to detector position 506. As discussed in the context of previous figures beam splitter 514 is present to permit mixing the scattered light with local oscillator light 509 propagating initially along a direction 510 towards beam splitter 514, where it is redirected to impinge on detector plane 508. If local oscillator beam 509 were collimated it is evident that its mean propagation direction would be the same as the mean propagation direction of the signal light viewed as a large beam. This direction is indicated by line 530. However, at individual pixel locations this is not true. For example, the mean propagation angle of light at pixel location 506 corresponds to the bisector of the dashed lines converging at 506. This direction is not generally collinear with line 530.

However, by inserting a lens 511 in the path of local oscillator beam 509 we can focus the LO beam in such a manner that it comes to a focus 512 and then spreads as beam 513 beyond the focus and fills detector plane 508. It is now evident that by choosing the lens and the various distances properly a condition can be created where the local oscillator beam propagation angle at each pixel location coincides with the mean propagation angle of the signal light at each corresponding pixel location. In this manner a design is obtained that permits high efficiency mixing of signal and local oscillator signals at each location. The optic 511 illustrated in FIG. 4 corresponds to the "LO Optics" element 1271 indicated in FIG. 3.

A further alternative improvement on matching wavefronts at all pixel locations is illustrated in FIG. 5. To understand this figure it is noted that the best possible matching of wavefronts can be obtained using the so-called back-propagated local oscillator (BPLO) method. This method is frequently used with single-pixel coherent laser radar systems. The method states that one can generate an optimally matched LO beam by starting with the field corresponding to an image point and propagate that field back through the system. If a local oscillator field is generated that matches that back-propagated field then an optimal match is found.

This principle can be applied to the imaging array shown in FIG. 5. FIG. 5 illustrates an object plane 604 that scatters light from multiple points 601–603. Each of these points gives rise to light 605 that propagates towards the sensor along the general direction 606, enters imaging system 607 and follows general direction 613 to form a corresponding set of image points 608–610 at image plane 611. If the imaging system is well-constructed each pixel location at image plane 611 can be treated as a small aperture upon which light converges from imaging system 607. As a result each pixel "sees" a converging spherical wave incident from a mean direction that depends on the distance of the pixel from the optic axis of the system. We can then create a well matched local oscillator field by back propagating independent fields from each pixel location. By inserting a beam splitter 612 in the path of these fields we can redirect these back-propagated fields along a direction 614. By placing an optical system 615, such as a lens, in the path of these back propagated fields, we can re-image image plane 611 onto a secondary image plane 616 with a desired magnification. There is then a one-to-one correspondence between points at the two image planes, for example point 608 images to point 618.

A suitable device 630 is placed at image plane 616 such that when the device is illuminated with a laser beam 619 the device causes fields to propagate in the forward direction through imaging system 615, reflect from beam splitter 612, and form a set of image points at each detector pixel in image plane 611. A number of different devices can be used at image plane 616 and proper operation of the invention does not rely on a specific device. One possibility is to divide the area into a number of segments 617, the number being substantially equal to the number of detector pixels at image plane 611. Each such segment is then caused to emit a spherical wave. This can be done by making the device a phase screen, such that each segment 617 in the screen causes a phase shift to be imposed on the part of beam 619 traversing that segment, such phase shift being substantially different from the phase shift imposed on parts of beam 619 that traverse adjacent segments of the screen. A device of this form has been disclosed in U.S. Pat. No. 5,610,705 to Brosnan in the context of a laser Doppler velocimeter.

A configuration as shown in FIG. 5 can be directly incorporated into the sensor architecture illustrated in FIG. 3 for example when "LO Optics" 1271 comprises the elements 615 and 630.

1. Camera Technology

One enabling technology is the development of low-cost imaging detector arrays (cameras) with low electrical noise and high speed. Low noise is essential in building the system as noted because efficient coherent (heterodyne) detection requires sufficient local oscillator power to be present to ideally produce shot-noise limited detection sensitivity. Shot noise represents fluctuations in the detector current that are induced by fluctuations in the local oscillator power. With currently available cameras the shot-noise limit may be reached with 10–100 µW or less of local oscillator power per pixel. If the camera has 1000 pixels the total amount of local oscillator power is then in the range of 10–100 mW. In a case where electrical noise forces the local oscillator power up by several orders of magnitude, the power may become so high that it becomes difficult to produce, it saturates the detector array, or it damages the camera through heating. This has been a significant limitation with previous camera technology.

High data rates are also important to implementation of the vibration sensor. At a minimum the camera must be able to output data at a rate equal to the per pixel bandwidth times the number of pixels. As an example if vibrations up to 5 kHz must be measured and 1000 pixels are desired the total data rate is 5 MHz. When sampled at the Nyquist limit of twice the highest frequency of interest this corresponds to requiring a digital sample of 10 Ms/s. Such data rates are available with current cameras. As an example, the model SU320MSW-1.7RT InGaAs camera from Sensors Unlimited can produce data rates of 10 Ms/s with future versions anticipated to be capable of at least 100 Ms/s. Further development of these and other cameras is likely to substantially increase the pixel counts and/or data throughput over time. Such devices can clearly be incorporated into the invention with resulting improvements in pixel counts and/or per pixel bandwidth. Using a 100 Ms/s device with 1000 pixels would make it possible to process signals with a bandwidth up to 100 kHz each. Such cameras can also often be programmed to output data from a predetermined selection of pixels, with the total data rate typically being the bottleneck that currently limits how many pixels can be processed for a given rate per pixel. If the total data rate is limited to 100 Ms/s it is therefore possible to output data from a large number of pixels, for example 10,000 as long as each pixel is limited to output at a rate of 10 ks/s. Conversely the same device may be programmed to output data from 100 pixels at a 1 Ms/s rate from each pixel. The appropriate partitioning of number of pixels versus per pixel data rate is determined by the specific application at hand.

In this context it is also notable that with freedom to select which pixels to process it is clearly possible to configure the optical system and the camera to process for example a line image rather than a 2-dimensional image. One can, for example, process a 100 pixel wide image at relatively high speeds per pixel. This can produce 2-dimensional imagery through so-called pushbroom and whiskbroom techniques where the second dimension is obtained by sweeping the array in one angle. This can be particularly useful when the platform is moving and the image along the track of movement is formed by the platform motion. At the same time it is apparent that pixel selection is not limited to selecting lines. In general any combination of pixels or groups of pixels can be selected for processing to meet desired measurement capability.

2. Signal Processing

The imaging sensor described produces data at a substantial rate. Generally the function of the signal processor is to extract the vibration signal from the raw mixed signal. One method to do this is to calculate fast Fourier transforms (FFT) on the signal arriving from each pixel. This method generally work well when the vibration amplitude is small because the mixed signal containing the vibration signal is a sine wave. When the vibration amplitude is large other methods must generally be used. One method is to calculate FFTs on short lengths of the signal to calculate instantaneous velocities. These velocities are subsequently used with curve fitting routines to reconstruct the time history of the vibration. A second method is to reconstruct the time varying phase of the vibration by calculating the change in mixed signal phase from sample to sample. It is important to note that the most computationally intensive part of calculations is computing FFTs, but existing fast Fourier transform processing chips can compute approximately 125,000 FFTs per second, each one with 1024 points. An example of use of such an FFT processor would be to capture 1024 samples per pixel at a sampling rate of 10 kHz. The data collection time would then be 100 ms for each pixel corresponding to 10 waveforms per second. The processor could then handle 12,500 pixels per second, which is sufficient for many applications. For faster data rates faster computers or multi-processor computers or computers with dedicated FFT hardware can be employed. Ultimately the FFT algorithm or other signal processing functions can be implemented directly in the camera itself As with camera technology, signal processing technology is rapidly improving, for example in the number of FFTs that can be processed in a given amount of time. Such future improvements in hardware, software and algorithms, can be incorporated into the invention in order to process more pixels per unit time, or to otherwise improve the measurement capability.

The vibratory motion is described in terms of a single vibration at a fixed frequency, but the invention is not limited to such simple cases. Many real vibrations are composed of multiple motions occurring simultaneously or at different times at a multitude of amplitudes and frequencies. These motions may also be transient in nature, rather than be continuous. Spectral analysis, for example using the signal processing techniques in accordance with the present invention, can recover both simple and complex vibratory behavior. In other words, the present invention is useful to reconstruct the full vibratory motion, rather than just reconstruct a single frequency.

3. Transmitter Lasers

The invention is not dependent upon use of any particular transmitter laser. It is important that the transmitter wavelength is matched to the spectral sensitivity range of the detector used; it has a sufficiently high frequency stability to be useful; and that it has enough power to produce sufficient signal and local oscillator power at the detector locations.

If InGaAs detector elements are used it may be advantageous to operate the camera system in the wavelength range of 1–2 micrometers. Laser sources in the approximately 1530–1620 nm range have some advantages here in that they present a reduced eye-hazard compared with common 1000–1100 nm lasers and that many component technologies are readily available that were developed for optical telecommunications systems. For example, it may be useful to incorporate frequency shifting devices or laser amplifiers into the system. Such components can be purchased from a number of vendors in the common telecommunications C and L bands that cover approximately 1530–1620 nm range. Cameras operating in the visible spectral range below 1000 nm, or infrared sensitive cameras operating at wavelengths greater than 2000 nm, can also be used provided that the transmitter laser is selected to output a wavelength in the appropriate range.

The second requirement is that the transmitter laser must produce a sufficiently narrow spectral line. Unintentional variations of the transmitter laser phase during the time of flight to and from the target causes uncertainties in the phase of the mixed signal which may degrade the recovered signal integrity. In general the desire is to use a source where the phase variation during the time of flight to the target and back is $<<2\pi$. The actual frequency stability requirement is consequently highly dependent on the intended target range. For example if the target range is 10 km the phase must remain stable over a time approximately equal to 67 microseconds, whereas if the range is 1 m the phase stability is only required over a 7 ns time.

The third requirement concerns laser power, which is dependent upon a number of factors, including: the number of pixels, attenuation in the atmosphere, target reflectivity characteristics, maximum target range, and signal processing characteristics and algorithms. Requirements may range from, for example, 0.1–10 mW per pixel, which for a 1000 pixel system would require between 100 mW and 10 W transmitted power. Such power is available from many solid-state lasers, but can also be obtained from diode lasers provided that these are followed by one or more laser amplifier stages. For operation in appropriate wavelength bands, such as the two common C and L telecommunication bands that cover approximately 1530–1620 nm, fiber amplifiers are particularly suitable to provide such output powers.

4. Alternative Embodiments

A number of alternative embodiments of the invention are possible as is obvious to those skilled in the art. Such alternative embodiments may be desired to meet specific requirements, including maximizing heterodyne mixing efficiency, optimal use of laser power, or flexibility in making vibration measurements.

Figure 6:
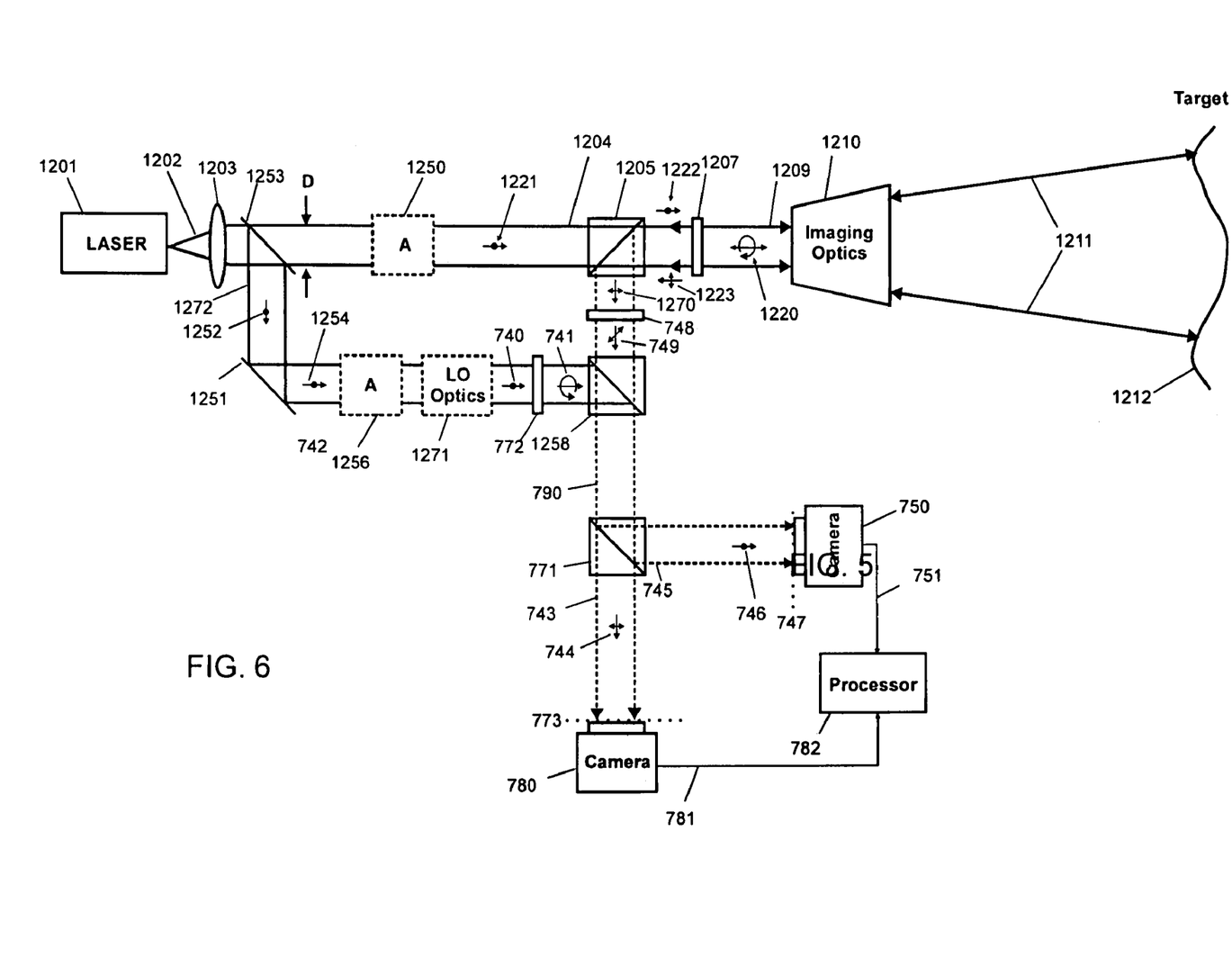
FIG. 6 shows an alternative embodiment of the invention where two cameras and optical I/Q detection are used to detect vibrations.

One specific embodiment uses two cameras to perform vibration measurements using homodyne I/Q detection. This embodiment is illustrated in FIG. 6 which includes a number of elements that are the same or perform the same function as corresponding elements in FIG. 3. Where this is the case the same numerals are used and the elements will not be described again. A key difference in this alternative embodiment is that received light scattered from target 1212 and reflected from polarizer 1205 passes through a wave plate 748 that converts linearly polarized light having its polarization axis in the plane of the paper into a beam linearly polarized at an angle of substantially 45 degrees to the plane of the paper as indicated by 749.

This signal beam is mixed in beam splitter 1258 with the local oscillator beam. The local oscillator beam results from beam 1272 being directed with optics 1251, and having a linear polarization state indicated by symbol 740, to pass through quarter-wave plate 772 in order to produce a circularly polarized beam as indicated by symbol 741. The beam splitter 1258 mixes local oscillator beam and the signal beam to form mixed beam 790 with a splitting ratio determined as discussed above. Mixed beam 790 is sent through polarizer 771 to form transmitted beam 743 having a linear polarization state indicated by 744 and a reflected beam 745 having an orthogonal linear polarization state 746. By putting cameras 780 and 750 equidistant from polarizer 771 target plane images will be formed at planes 773 and 747. These cameras are linked via lines 781 and 751 to signal processor 782 where vibration information is extracted.

Processing the vibration information can be performed in a manner similar to that used with heterodyne detection. The primary difference is that the absolute phase of the vibrating signal is derived from the relative phase measurements of the two camera signals. The alternative ways of producing a matched local oscillator beam discussed above apply to this homodyne case.

Figure 7:
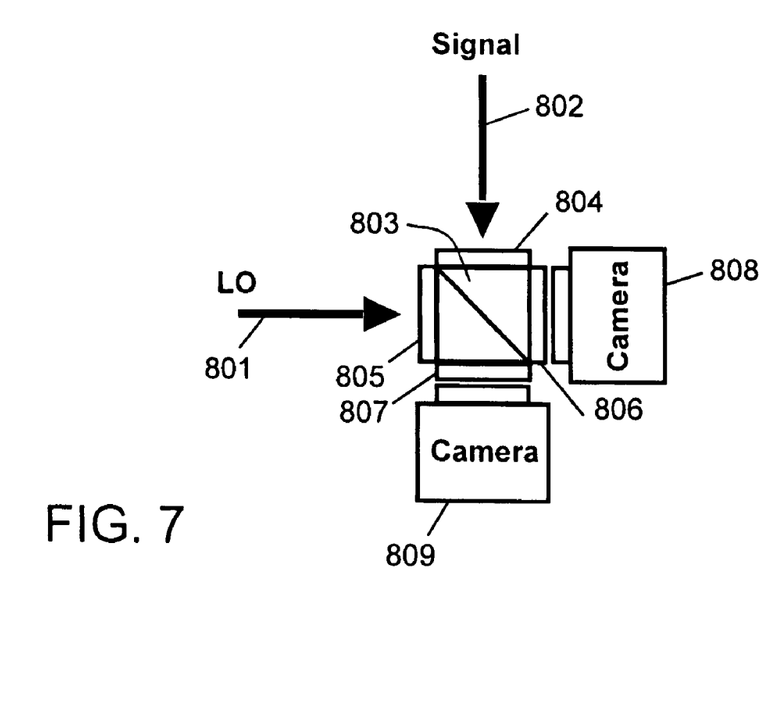
FIG. 7 shows a compact optical configuration to implement optical I/Q detection using two cameras.

FIG. 6 illustrates one possible implementation of a homodyne I/Q detection system that uses two cameras, but a number of other possibilities exist. What is generally important is to use polarization states to combine local oscillator and signal light in an appropriate manner, not the exact details of how this is done. FIG. 7 shows an example of a compact arrangement that accomplished the same ultimate goal. In FIG. 7 linearly polarized local oscillator beam 801 and signal beam 802 are incident on a beam splitter 803. LO beam 801 passes through QWP 805 attached to beam splitter 803, while signal beam 802 passes through half-wave plate 804 also attached to beam splitter 803. Polarizers 806 and 807 are also attached to beam splitter 803 and have their pass axes oriented at a relative angle of 90 degrees to one another. This has the desired effect of producing I and Q detection channels on cameras 808 and 809.

Figure 8:
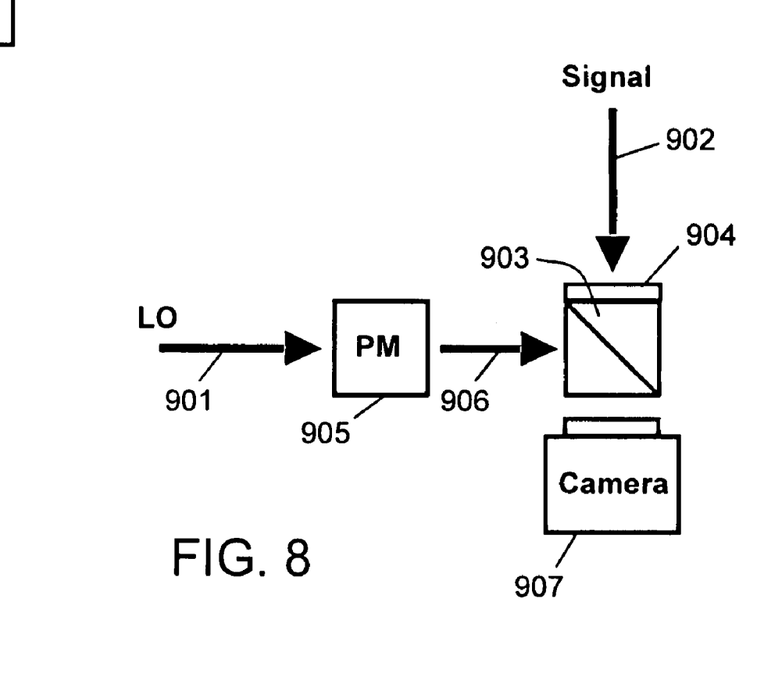
FIG. 8 shows an arrangement to use a single camera and a phase-shifter to implement optical I/Q detection using a single camera.

Another alternative embodiment of the system is illustrated in FIG. 8. This arrangement eliminates the need for two cameras yet still recovers I and Q signals for homodyne measurements. In the figure local oscillator beam 901 and signal beam 902 are mixed in beam splitter 903. As in previous FIG. 7, signal beam 902 passes through half-wave plate 904, preferably attached to beam splitter 903. Local oscillator beam 901 is however passed through a dynamically variable optical wave plate 905. This element may be, for example, an optical phase modulator (PM) in the form of an electro-optical device or a liquid crystal device. The device is operated such that it switches the local oscillator between two orthogonal polarization states at a frequency generally at least twice the highest vibration frequency of interest. This has the effect that the camera on alternating switching states detects the I and Q states of the signal beam. For a given frequency range of interest this arrangement trades off sampling at twice the rate in exchange for only needing one camera. There is generally also the effect of only using half the signal, which is frequently not a significant drawback when the system is operated in the high SNR regime.

Another alternative embodiment takes advantage of the fact that beam splitter 1258 in FIG. 6 cannot be completely efficient in mixing the local oscillator beam and the signal beam. If, for example, 20% of the local oscillator beam is reflected and combined with 80% of the signal beam, then 80% of the local oscillator beam transmits through beam splitter 1258 and 20% of the signal beam reflects from beam splitter 1258. Capturing this otherwise wasted light (in which case the beam splitter reflectivity may advantageously be altered to for example 50%) with a second set of polarization optics similar to 771, cameras similar to 750 and 780, and signal processing means similar to 782, has the benefit of more efficient use of available light. It also enables the two sets of cameras to operate in differential mode where common noise (such as fluctuations in the local oscillator) may be subtracted out, thereby improving the fidelity of the measurements.

Another alternative embodiment uses a reduced number of cameras, advantageously only one. In this fourth embodiment optics are utilized not to split the mixed beams and direct them to different cameras, but rather to redirect the mixed beams to different portions of the detector array of a single camera. This method can be applied to any of the embodiments disclosed previously. In the case of replacing two cameras with one camera in this manner, all other factors being equal, the main requirement is that the single camera has substantially twice the number of pixels and is able to transfer twice as much data per unit time.

While the present invention has been shown and described in the context of specific examples and embodiments thereof, it will be understood by those skilled in the art that numerous changes in the form and details may be made without departing from the scope and spirit of the invention as encompassed in the appended claims.

I claim:

1. A vibration imaging device comprising:
a light beam having a substantially single frequency and transmitted to illuminate a scene, whereby scattered light is produced by the illuminated scene;
a local oscillator light beam;
mixing optics operable to output a mixed beam, comprising scattered light from the illuminated scene coherently mixed with the local oscillator light beam;
a plurality of detector elements, wherein each detector element is optically coupled to the mixing optics to receive a portion of the mixed beam corresponding to a scene point, wherein each detector element generates a detector output signal; and
a signal processor coupled to receive the detector element output signals from each of the plurality of detector elements, wherein the signal processor determines the vibratory motion of each scene point from the detector element output signals.

2. The vibration imaging device of claim 1 wherein the plurality of detector elements are provided in a detector array.

3. The vibration imaging device of claim 2 wherein the detector array comprises an InGaAs detector array.

4. The vibration imaging device of claim 2 wherein the detector array comprises a silicon detector array.

5. The vibration imaging device of claim 2 wherein the detector array comprises a charge coupled device (CCD) array.

6. The vibration imaging device of claim 1 wherein a frequency shift is imposed between the local oscillator light beam and the scattered light.

7. The vibration imaging device of claim 1 further comprising a polarizer to split the mixed beam into in-phase and quadrature components, wherein the plurality of detector elements comprises a first set of detector elements receiving the in-phase component and a second set of detector elements receiving the quadrature component, and wherein the signal processor determines the vibratory motion of each scene point from the heterodyne beat signals and the relative phase of the in-phase and quadrature components.

8. The vibration imaging device of claim 7 wherein the first and second set of detector elements comprise two detector arrays.

9. The vibration imaging device of claim 1 further comprising receiver optics, wherein the receiver optics images scattered light from the illuminated scene onto the plurality of detector elements.

10. The vibration imaging device of claim 1 further comprising a laser configured to generate the light beam.

11. The vibration imaging device of claim 10 wherein the laser is a semiconductor diode laser.

12. The vibration imaging device of claim 1 further comprising splitting optics coupled to the light beam and operable to split the light beam into a transmission portion illuminating the scene and a local oscillator portion providing the local oscillator light beam.

13. The vibration imaging device of claim 1 wherein the signal processor implements a fast Fourier transform (FFT) algorithm to determine the vibratory motion.

14. The vibration imaging device of claim 1 wherein the signal processor comprises a surface acoustic wave (SAW) filter to determine the vibratory motion.

15. The vibration imaging device of claim 1 wherein the signal processor implements a fast Fourier transform (FFT) algorithm to determine an instantaneous velocity of each of the scene points and determines the vibratory motion from a time evolution of the instantaneous velocity.

16. The vibration imaging device of claim 1 wherein the signal processor determines the vibratory motion from a calculation of the temporal change in phase of the detector element output signals.

17. The vibration imaging device of claim 1 further comprising a phase-shifter wherein the scattered light and the local oscillator beam are alternatively phase-switched by a predetermined amount to alternatively produce in-phase and quadrature signals at the plurality of detector elements.

18. The vibration imaging device of claim 17 wherein the predetermined amount is substantially 90 degrees.

19. A method for vibration imaging comprising:
transmitting a light beam having a substantially single frequency and to illuminate a scene, whereby scattered light is produced from scene points in the illuminated scene;
generating a local oscillator light beam;
coherently mixing the scattered light from a plurality of scene points and the local oscillator light beam to produce a mixed beam;
detecting a plurality of component signals in the mixed beam, wherein each component signal corresponds to a scene point;
determining the vibratory motion of each scene point from the component signals; and
outputting information regarding the determined vibratory motion of each scene point.

20. The method of claim 19 further comprising:
providing a frequency shift between the local oscillator light beam and the scattered light.

21. The method of claim 20 further comprising:
splitting the mixed beam into in-phase and quadrature components before the act of detecting.

22. The method of claim 21 wherein the act of detecting comprises separately detecting the in-phase component and the quadrature component.

23. The method of claim 22 wherein the act of determining the vibratory motion of each scene point comprises using the relative phase of the in-phase and quadrature components.

24. The method of claim 19 wherein the act of generating a local oscillator light beam comprises splitting the light beam into a transmission portion illuminating the scene and a local oscillator portion providing the local oscillator light beam.

25. The method of claim 19 wherein the act of determining the vibratory motion of each scene point further comprises:
determining an instantaneous velocity of each of the scene points; and
determining the vibratory motion from a time evolution of the instantaneous velocity.

26. The method of claim 25 wherein the vibratory motion is determined from a calculation of the temporal change in phase of the detector output signals.

27. The method of claim 19 further comprising:
alternatively phase switching the transmitted light and the local oscillator beam by substantially 90 degrees to alternatively produce in-phase and quadrature signals.

* * * * *